United States Patent
Mehta et al.

(10) Patent No.: US 8,516,498 B2
(45) Date of Patent: Aug. 20, 2013

(54) HANDLING A DELIVERY FAILURE AS A PROGRAM EXCEPTION IN A DISTRIBUTED ASYNCHRONOUS ARCHITECTURE

(75) Inventors: Bimal Mehta, Sammamish, WA (US); Paul Maybee, Seattle, WA (US); Lee Graber, Kirkland, WA (US); Alexander Dadjomov, Redmond, WA (US); Jean-Emile Elien, Bellevue, WA (US); Eldar Azerovich Musayev, Sammamish, WA (US); Johannes Klein, Sammamish, WA (US); Sanjib Saha, Bellevue, WA (US); Kevin Bowen Smith, Sammamish, CA (US)

(73) Assignee: Microsoft Corporation, Redmond, WA (US)

( * ) Notice: Subject to any disclaimer, the term of this patent is extended or adjusted under 35 U.S.C. 154(b) by 1989 days.

(21) Appl. No.: 10/698,762

(22) Filed: Oct. 31, 2003

(65) Prior Publication Data

US 2005/0096927 A1 May 5, 2005

(51) Int. Cl.
*G06F 9/44* (2006.01)
*G06F 11/00* (2006.01)

(52) U.S. Cl.
USPC ............... 719/313; 714/25; 714/48; 719/318

(58) Field of Classification Search
USPC ............ 705/1–28; 709/201–207, 213–219; 718/106; 719/311–315, 318; 714/2, 25, 714/48, 47; 717/124, 127
See application file for complete search history.

(56) References Cited

U.S. PATENT DOCUMENTS

| | | | | |
|---|---|---|---|---|
| 5,377,337 | A | 12/1994 | Antognini et al. | 718/100 |
| 6,560,626 | B1 | 5/2003 | Hogle et al. | 718/102 |
| 6,804,818 | B1* | 10/2004 | Codella et al. | 719/315 |
| 7,036,045 | B2* | 4/2006 | Broussard et al. | 714/37 |
| 7,370,244 | B2* | 5/2008 | Breitling et al. | 714/49 |
| 2002/0111996 | A1* | 8/2002 | Jones et al. | 709/203 |
| 2002/0156664 | A1* | 10/2002 | Willcox et al. | 705/7 |
| 2002/0188714 | A1* | 12/2002 | Bouthors | 709/223 |
| 2003/0093500 | A1* | 5/2003 | Khodabakchian et al. | 709/219 |
| 2003/0105858 | A1* | 6/2003 | Hogg et al. | 709/224 |
| 2003/0204835 | A1* | 10/2003 | Budhiraja et al. | 717/120 |
| 2005/0027559 | A1* | 2/2005 | Rajan et al. | 705/1 |
| 2005/0086297 | A1* | 4/2005 | Hinks | 709/203 |

OTHER PUBLICATIONS

Barros, A.P. et al., "Modelling Concurrent Process Coordination in Workflow Specifications", *Information System Concepts: An Integrated Discipline Emerging, International Conference on Information System Concepts: an Integrated Discipline Emerging*, 2000, 141-164.

(Continued)

*Primary Examiner* — Charles E Anya
(74) *Attorney, Agent, or Firm* — Woodcock Washburn, LLP

(57) ABSTRACT

A system and method of processing a message in an asynchronous architecture is provided. In the method, a determination is made that a response to a message sent by an instance of software code is to be received, where the response indicates whether the message succeeded or failed. Another determination is made as to whether the response has been received. If the response has not been received, the instance of the software code is stored in memory, thereby suspending the instance. The response is received, the instance resumed and the response is processed.

33 Claims, 7 Drawing Sheets

(56) References Cited

OTHER PUBLICATIONS

Barros, A.P. et al., "Towards Real-Scale Business Transaction Workflow Modelling", *Advanced Information Systems Engineering, 9th International Conference*, 1997, 437-450.

Cheung, S.C. et al., "Data-Driven Methodology to Extending Workflows to E-Services over the Internet", *Dept of Computer Science, Hong Kong University of Science & Technology, China*, 2003, 10.

"Web Services Description Language, *Web Service Definition Language* (WSDL) 1.1", W3CNote, Mar. 15, 2001, 51 pages.

"Business Process Execution Language for Web Services", May 5, 2003, Version 1.1, Published by Microsoft, IBM, and BEA (For the Definition of Business Process Semantics), 67 pages.

* cited by examiner ized. The seller then checks its inventory to determine if it can provide the ordered items. If so, the seller sends an acknowledgement back to the buyer with a price. Finally, the buyer accepts or rejects the seller's offer (and/or possibly places another order). As evident in this example, each participant's business application reacts to the receipt of messages.

HANDLING A DELIVERY FAILURE AS A PROGRAM EXCEPTION IN A DISTRIBUTED ASYNCHRONOUS ARCHITECTURE

FIELD OF THE INVENTION

The present invention relates generally to software development. More particularly, the present invention relates to a method and system for handling message delivery failures in a distributed asynchronous architecture. Even more particularly, the present invention relates to a method of processing asynchronous message confirmation and failure messages in a synchronous manner.

BACKGROUND OF THE INVENTION

A business may use a software application, such as a web service, to automate business processes and to interact with other entities in a distributed environment, such as the Internet or World Wide Web. To ensure that such interactions are accomplished successfully, one or more protocols should be in place for carrying messages to and from participants, and specific business applications should also be in place at each participant's end. Such interactions are message-driven. For example, a buyer sends a purchase order to a seller. The seller then checks its inventory to determine if it can provide the ordered items. If so, the seller sends an acknowledgement back to the buyer with a price. Finally, the buyer accepts or rejects the seller's offer (and/or possibly places another order). As evident in this example, each participant's business application reacts to the receipt of messages.

Such message-based transactions may not be completed for a relatively long period of time (e.g., if the seller takes several days to check its inventory before responding to the purchase order). As a result, information regarding the state of the application must be stored, or "persisted," so as to complete the transaction successfully when, for example, a response is finally received. Persisting the state of the application also makes the application less prone to errors. For example, if the application is shut down due to a power failure the stored state information allows the application to resume in the same state when the application is restarted as when the failure occurred.

Accordingly, a distributed transactional application is a software application that runs in a distributed environment and persists the state of the application data in a server in a transactional manner. An example of such a distributed transactional application is business process orchestration software, which enables the automated management of multiple instances of a business process. In such software, the code that implements a particular business process is referred to as an "orchestration service," and one or more orchestration services may run concurrently on a single "host service." Business process orchestrations may be implemented using a business process software language such as, for example, XLANG/s. Business process software languages such as XLANG/s are said to handle messages in an "asynchronous" manner, because, as noted above, a message may not immediately generate a response or status indicator.

When messages are sent by software, an "ACK/NACK" message is typically sent by the receiving party to either confirm the receipt of the message or to notify the sender of an error. Thus, a developer who is creating software to handle traditional synchronous messaging needs only to include a "try-catch" code block to process the ACK/NACK message and handle any errors. A try-catch code block defines a block of statements that is capable of handling exceptions that occur during the execution of those statements. The use of try-catch blocks for handling program exceptions when processing synchronous messages is familiar to developers and easy to implement.

While asynchronous message handling is essential for effectively automating business processes, such message handling causes programming complications as compared to its synchronous counterpart. For example, business process software that handles asynchronous messaging typically does so by way of compensation handlers that operate outside the context of the main program. Such placement of the compensation handler is necessary because the main program cannot wait for the acknowledgement or error notification that, as noted above, may not arrive for a long period of time. As a result, XLANG/s permits the business process to continue and uses compensation handlers to, as the name implies, compensate for any message failures. Using the buyer/seller example discussed above, a compensation handler may recognize that a particular business transaction did not complete properly, and that the buyer's account should be credited with the purchase price. Thus, the compensation handler may send another message to credit the buyer's account.

Because it is handled outside of the context of the main program, a compensation handler adds complexity to the automation of the business process. For example, the developer must keep track of what the main program is doing and what processes have been completed so as to create a compensation handler that will take appropriate actions to rectify errors. Otherwise, the compensation handler may not properly compensate for the message error, or may even create new errors.

Accordingly, and in light of the above shortcomings, what is needed is a method for handling asynchronous message errors in a manner that enables error handling within the main program. More particularly, what is needed is a method for handling asynchronous message errors with a synchronous-type try-catch code block. Even more particularly, what is needed is a method of pausing the main program until an ACK/NACK message is received, and then resuming the program so as to enable handling of the ACK/NACK message using a try-catch block.

SUMMARY OF THE INVENTION

In light of the foregoing limitations and drawbacks, a system and method of processing a message in an asynchronous architecture is provided. In the inventive method, a determination is made that a response to a message sent by an instance of software code is to be received. The response indicates whether the message succeeded or failed. Another determination is made as to whether the response has been received. If the response has not been received, the instance of the software code is stored in memory, thereby suspending the instance. At some point, the response is received and the instance resumed. Once the instance is resumed, the response is processed. Processing the response may include, for example, determining whether the response indicates a failure and, if so, processing the response using a catch block within the instance of the software code.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

A method of handling messaging errors in an asynchronous architecture is provided. In one embodiment, the inventive method uses XLANG/s dehydration functionality to permit an orchestration instance to be paused while awaiting a message confirmation or failure notification. In such a manner, a try-catch code block that is conventionally used for synchronous messaging may be used to handle asynchronous messaging within the context of the main program that is automating the implementation of the business method. As will be discussed below, such a method enables the use of familiar, synchronous-style programming techniques in an asynchronous developing environment.

Before discussing the present invention in detail, we will first describe exemplary computing and network environments in which the invention may be advantageously practiced.

Exemplary Computing Environment

Figure 1:
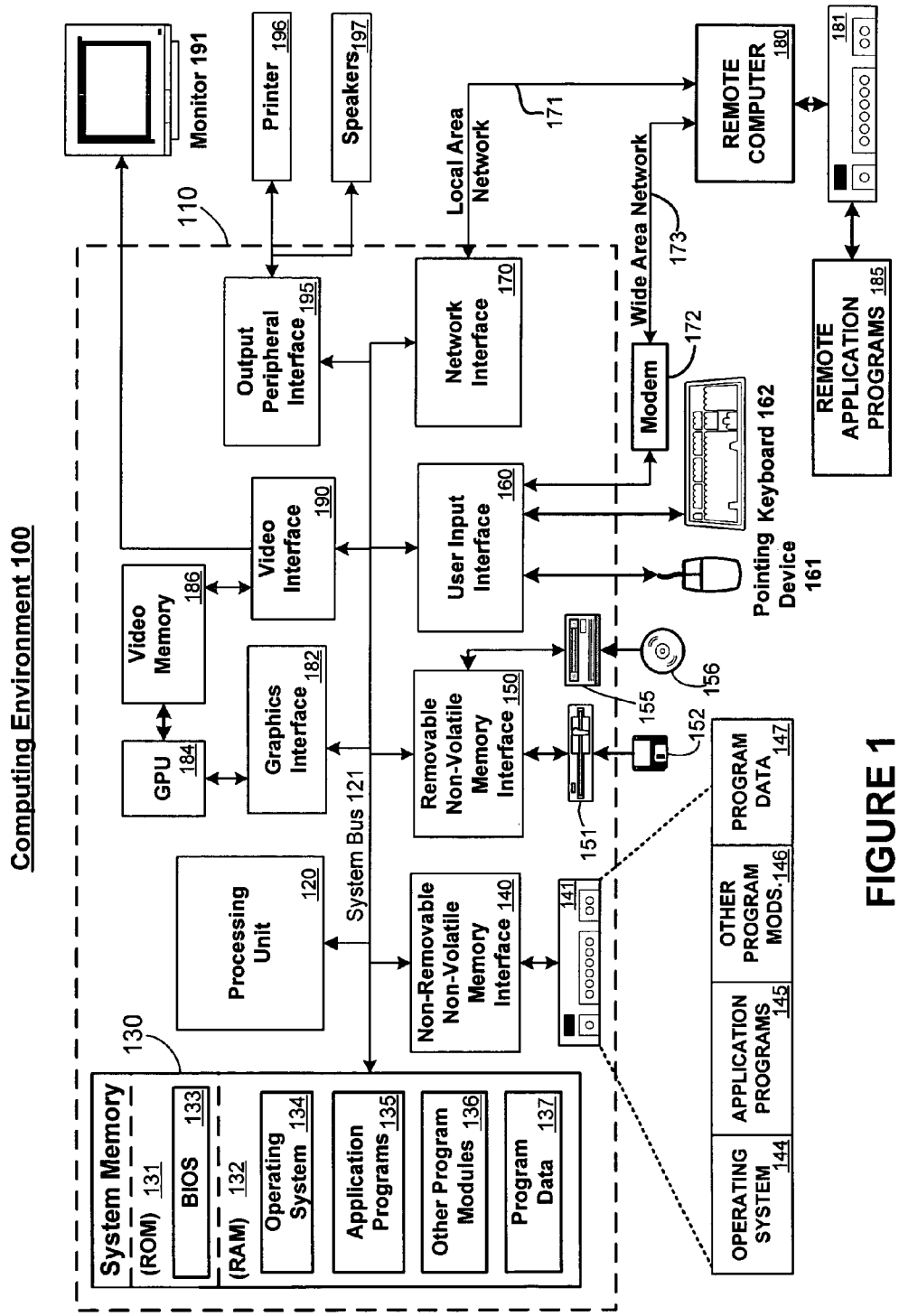
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Introduction to Web. Services

As noted above, businesses are more frequently interacting via distributed environments, such as the Internet or World Wide Web. For example, a consumer may want to know the prices of rental cars for an upcoming trip. The consumer may request the prices through an intermediate business on the Internet, such as a travel website. The intermediate business, upon receiving the consumer's request, sends price quote requests to a variety of rental car businesses. After responses are received from the rental car businesses, the intermediate business then sends the responses to the consumer. The consumer may then reserve a car and pay for the reservation by way of the intermediate business. The business processes discussed above are implemented using messages. For example, the consumer's request to the intermediate business is implemented as an electronic message to the intermediate business that contains the particulars of the proposed car rental, for example: rental dates and times, type of car, additional insurance desired, consumer's name and address, credit card information and/or the like. The intermediate business' price quote request is another message, as are the responses from the rental car businesses—both to the intermediate business from the rental car businesses and from the intermediate business to the consumer—and the reservation ultimately sent by the consumer.

One computer language that is designed to automate business processes and the messages used to carry out such processes is XLANG/s, which is described in more detail, below. As may be appreciated, it is important that the business processes that are implemented using XLANG/s execute properly, and without errors. In addition, such processes should be robust enough to compensate for external errors, such as messaging errors due to communications link failures and the like. Providing a method and system for handling such messaging errors to accomplish such business processes in a robust and error-free manner is an application of an embodiment of the present invention.

XLANG/s Introduction

As noted above, an embodiment of the present invention is implemented in a stateful computing language. One such language that is compatible with an embodiment of the present invention is XLANG/s. XLANG/s is a language that describes the logical sequencing of business processes, as well as the implementation of the business process by using various technology components or services. XLANG/s is described in more detail than is disclosed herein in a document titled "XLANG/s Language Specification," Version 0.55, Copyright© Microsoft 1999-2000, and a document titled "XLANG Web Services For Business Process Design," Satish Thatte, Copyright© Microsoft Corporation 2001, both of which are hereby incorporated by reference in their entirety. The XLANG language is expressed in Extensible Markup Language (XML). XLANG/s is a modern, domain specific, special purpose language used to describe business processes and protocols. XLANG/s is also a declarative language, which means that it defines an explicit instruction set that describes and implements steps in a business process, the relationship between those steps, as well as their semantics and interactions. In addition, XLANG/s code is not just descriptive; it is also designed to be executable. Because of the declarative nature of XLANG/s and its specific semantics, the resulting executable code is deterministic; that is, the behavior of the running business process is well defined by the semantics of the collection of XLANG/s instructions. Therefore, by examining XLANG/s code one is able to determine the business process that is carried out by such code. As noted above, the definition of such a business process in executable form is an "orchestration service."

XLANG/s is compatible with many Internet standards. XLANG/s is designed to use XML, XSLT (http://www.w3.org/TR/xslt), XPATH (http://www.w3.org/TR/xpath), XSD (XML Schema Definition) and WSDL (Web Services Description Language) as supported standards and has embedded support for working with .NET based objects and messages. WSDL is described in a document titled "Web Services Description Language (WSDL) 1.1," W3C Note January 2001, by Microsoft and IBM Research, Copyright© 2000 Ariba, International Business Machines Corporation, Microsoft, and is hereby incorporated by reference in its entirety. The XLANG/s language is syntactically similar to C#, thus a C# specification may also be referenced as an aid to understanding the exact syntax. The semantics embodied in XLANG/s are a reflection of those defined in a document entitled "Business Process Execution Language for Web Services," Version 1.1, dated Mar. 31, 2003, published by Microsoft, IBM and BEA for the definition of Business Process semantics, which is also hereby incorporated by reference in its entirety. The Business Process Execution Language for Web Services specification is commonly referred to as the "BPEL4WS" specification. As may be appreciated, therefore, the use of XLANG/s is most advantageous when applied to a business process.

XLANG/s defines a rich set of high-level constructs used to define a business process. XLANG/s statements generally fall into one of two categories: simple statements that act on their own, such as receive or send, and complex statements that contain or group simple statements and/or other complex statements. XLANG/s also supports low-level data types such as strings or integers, for example. High-level data types are also defined such as, for example, messages, ports (locations to which messages are sent and received), correlations and service links. The data types are used to rigorously define the semantics associated with the business process.

As noted above, a XLANG/s service communicates with the outside world by sending and/or receiving messages. The message type is the structural definition of such a message. Messages are acted upon by operations (e.g., receive, response), and an operation may be either a single asynchronous message or a request-response pair of messages. As was also noted above, in either type of operation, an ACK/NACK message may not be received for some time after the original message was sent. Operations may be either incoming or outgoing. For example, a seller may offer a service/product that begins an interaction by accepting a purchase order (from a potential buyer) by way of an input message. The seller may then return an acknowledgement to the buyer if the order can be fulfilled. The seller may send additional messages to the buyer (e.g., shipping notices, invoices). Typically, these input and output operations occur in accordance with a defined sequence, referred to as a "service process." The seller's service remembers the state of each purchase order interaction separately from other similar interactions. This is particularly advantageous in situations in which the buyer may be conducting many simultaneous purchase processes with the same seller. Also, each instance of a service process may perform activities in the background (e.g., update inventory, update account balance) without the stimulus of an input operation.

A service process may represent an interaction utilizing several operations. As such the interaction has a well-defined beginning and end. This interaction is referred to as an instance of the service. An instance can be started in either of two ways. A service can be explicitly instantiated using some implementation-specific functionality or a service can be implicitly instantiated with an operation in its behavior that is meant to be an instantiation operation. A service instance terminates when the process that defines its behavior terminates.

Services are instantiated to act in accordance with the history of an extended interaction. Messages sent to such services are delivered not only to the correct destination port, but to the correct instance of the service that defines the port. A port is an end point where messages are sent and received by a service. The infrastructure hosting the service supports this routing, thus avoiding burdening every service implementation with the need to implement a custom mechanism for instance routing.

Figure 2:
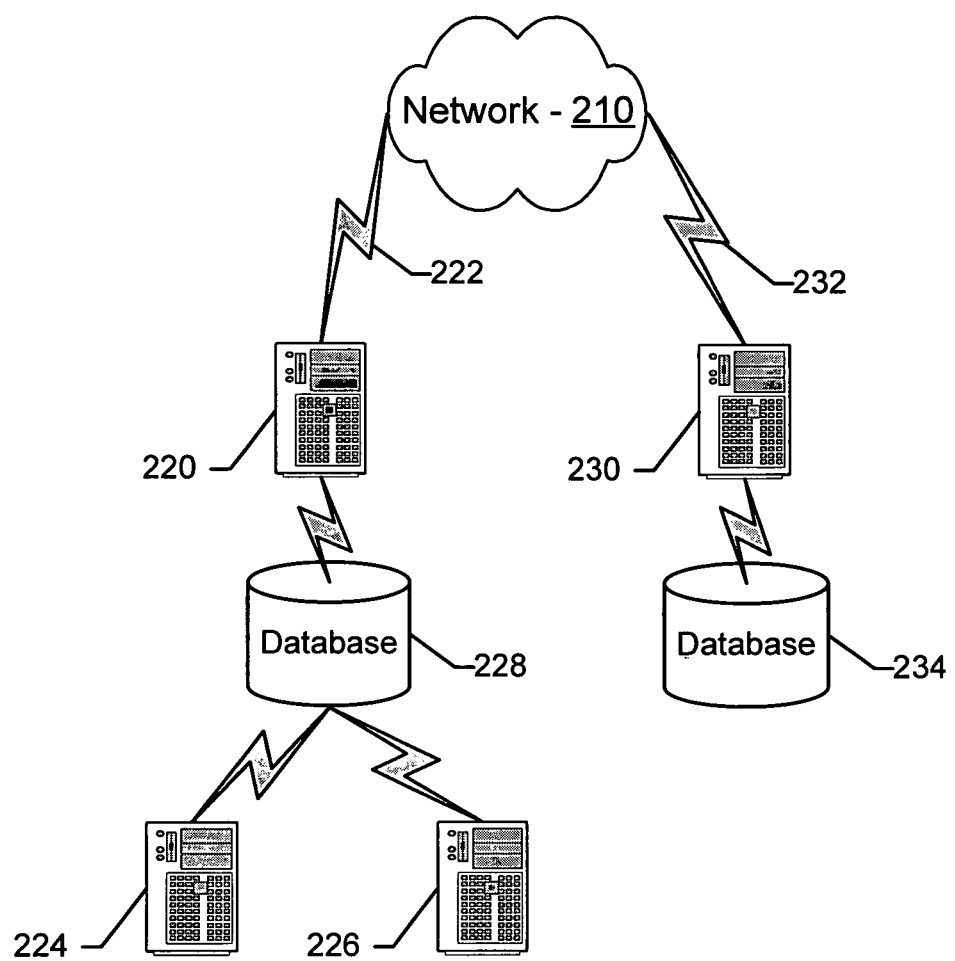
FIG. 2 is a diagram illustrating an exemplary computing network in which aspects of the invention may be implemented.

Turning now to FIG. 2, a simplified, exemplary computer network for enabling communications between two business entities is illustrated. A first computer 220, which is any type of computing device such as, for example, computer 110 as disclosed above in connection with FIG. 1, a special-purpose computer or the like, is operatively connected to a network 210 by way of communications link 222. First computer 220 is also operatively connected to a database 228, which in one embodiment contains business process-specific information as will be discussed below. Database 228 may be internal to the first computer 220, or may be located on another device. Network 210 may be any type of network for interconnecting a plurality of computing devices, and may be an intranet, the Internet, etc. Communications link 222 may comprise any type of communications medium, whether wired, wireless, optical or the like. Second computer 230, like first computer 220, may be any type of computing device, and is operatively connected to network 210 by way of communications link 232. As can be seen in FIG. 2, second computer 230 is also operatively connected to a database 234.

Communications link 232, like communications link 222, may be any type of communications medium. In one embodiment, communications links 222 and 232 are the same type of communications medium, while in another embodiment the medium employed by each communications link 222 and 232 is different. In FIG. 2, it can be seen that first computer 220 is also operatively connected to computers 224 and 226 by way of database 228. As may be appreciated, additional computers may be operatively connected to second server 230 as well (not shown in FIG. 2 for clarity). It will be appreciated that, although described herein as computers 220, 224, 226 and 230, such computers may be a client or a server computer, or a combination of both, depending on the exact implementation of the computer network and the relationship between computers during a transaction. It will also be appreciated that any combination or configuration of computers and databases is equally consistent with an embodiment of the present invention.

For example, consider a typical supply chain situation in which a buyer sends a purchase order to a seller. The buyer sends the message from, for example, first computer 220 to the seller's second computer 230 by way of the network 210 and communications links 222 and 232. Assume, for example, that the buyer and seller have a stable business relationship and are statically configured—by way of settings stored in databases 228 and 234—to send documents related to the purchasing interaction to the URLs associated with the relevant ports. When the seller returns an acknowledgement for the order, the acknowledgement is routed to the correct service instance at the buyer's end at first computer 220 or, optionally, another computer such as additional computer 224 or 226, by way of database 228. One way to implement such a routing is to carry an embedded token (e.g., cookie) in the order message that is copied into the acknowledgement for correlation. The token may be in the message "envelope" in a header or in the business document (purchase order) itself. The structure and position of the tokens in each message can be expressed declaratively in the service description. This declarative information allows a XLANG/s-compliant infrastructure to use tokens to provide instance routing automatically.

In one embodiment of the present invention, another function of databases 228 and 234 is to serve as a repository for persisted state information for any instances of an orchestration service. For example, first computer 220 transmits a message to second computer 230 in accordance with a service process for a currently-running orchestration service. Upon first computer 220 sending the message, database 228 records the state information for the instance. In such a case, the state information may record that a message has been sent to second computer 230, the content of a message; and that the first computer 220 is waiting for a response. Upon the occurrence of second computer 230 receiving first computer's 220 message, database 234 records the state information for the instance. In the present example, such state information indicates that a message from first computer 220 was received, the contents of such message and that a response should be generated.

Accordingly, if a communication error or power interruption occurs, upon resolution of the problem first computer 220 will know that it has sent a message to second computer 230 and is currently waiting for a response, and second computer 230 will know that it has received a message from first computer 220 and should generate a response. In addition, the storage of state information for an instance of an orchestration service enables the processing of long-running transactions. For example, and as noted above, the business process being implemented by the orchestration service may take a long period of time to generate a response to the message. In such a case, both first and second computers 220 and 230 can process other orchestration services and then return to the instance at the correct point in its service process once the response is generated.

During its lifetime, a service instance may typically hold one or more conversations with other service instances representing other participants involved in the interaction. Conversations may use a sophisticated transport infrastructure that correlates the messages involved in a conversation and routes them to the correct service instance. In many cases, correlated conversations may involve more than two parties or may use lightweight transport infrastructure with correlation tokens embedded directly in the business documents being exchanged. XLANG/s addresses correlation scenarios by providing a very general mechanism to specify correlated groups of operations within a service instance. A set of correlation tokens can be defined as a set of properties shared by all messages in the correlated group. Such a set of properties is called a correlation set.

Description of Embodiments of the Present Invention

The description contained herein is not intended to limit the scope of this patent. Rather, the inventors have contemplated that the claimed subject matter might also be embodied in other ways, to include different elements or combinations of elements similar to the ones described in this document, in conjunction with present or future technologies.

Accordingly, it will be appreciated that an embodiment of the present invention is equally compatible with any type of stateful computer programming language that is capable of automating a distributed business process. Therefore, the description herein reflecting the use of XLANG/s is merely illustrative, as other languages may be appropriate for use with an embodiment of the present invention. In addition, it will be appreciated that the use herein of XLANG/s-specific terminology such as, for example, "orchestration" and the like is done for the sake of clarity and in no way implies that only XLANG/s components or functionality may be used in connection with the present invention. Accordingly, other components and/or functionality may be used in accordance with an embodiment of the present invention.

Figure 3:
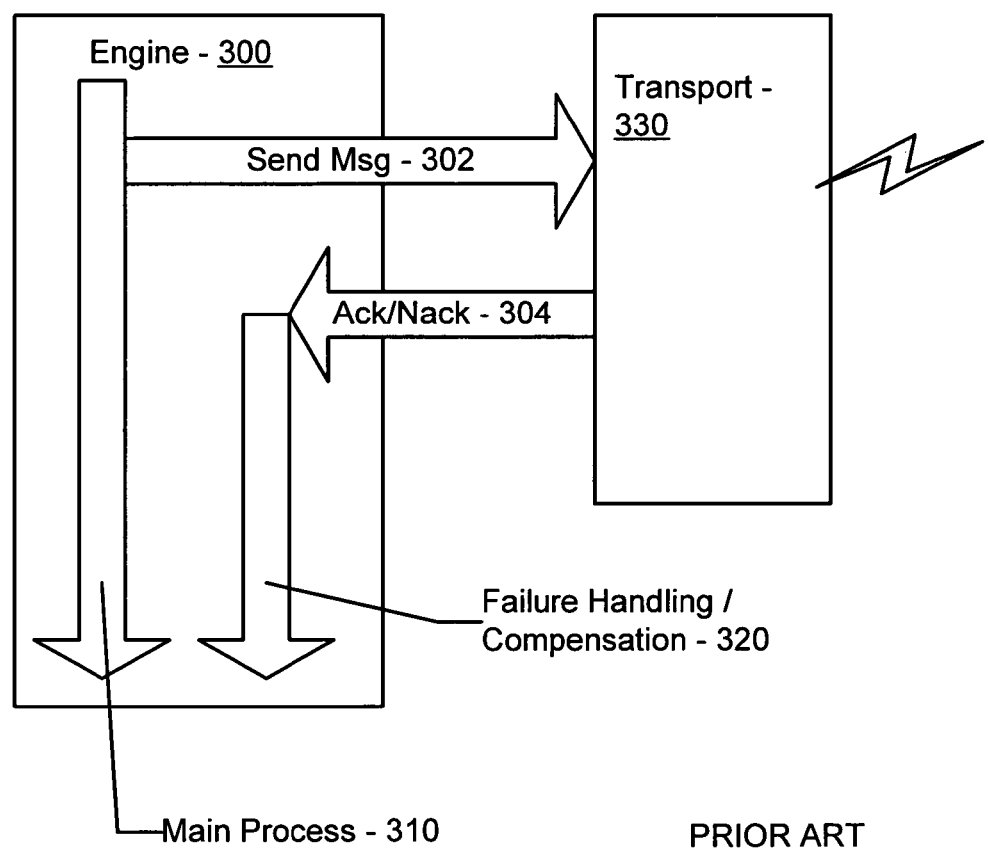
FIG. 3 is a block diagram illustrating a conventional method of handling asynchronous message errors.

In the discussion to follow, it will also be appreciated that details pertaining to the automation of business processes such as, for example, the programming, configuration and implementation of such processes in software should be known to one of skill in the art and are therefore omitted herein for clarity. As noted above, traditional methods of handling asynchronous messaging errors involve the use of compensation handlers. For the sake of comparison, a block diagram illustrating such a configuration adapted for such a method is shown in FIG. 3. Referring now to FIG. 3, a business process engine 300 is illustrated. It will be appreciated that an engine 300 is, in one embodiment, a service that runs XLANG/s schedule instances and controls the activation, execution, dehydration and rehydration of an XLANG schedule. Concepts such as dehydration and rehydration will be discussed in greater detail below in connection with FIG. 4. Within engine 300, a main process 310 automates one or more business processes in accordance with its programming.

At some point in the main process 310, the process 310 sends a message 302 intended to carry out an operation of a business process to a transport 330. A transport 330 is a set of services that includes network protocols and application integration components, which enable a server running the engine 300 to send documents to organizations or applications whether or not the applications are capable of communicating directly with the server by using, for example, a COM interface. As will be discussed below in connection with FIG. 6B, XLANG/s supports, among other protocols, the file, HTTP, HTTPS, and SMTP network protocols, as well as Message Queuing and the like. It will be appreciated that the transport 330 transmits the message 302 to its intended recipient, and also facilitates a return confirmation message.

At some point after the transport 330 has received the message 302, a confirmation message, or ACK/NACK 304, is sent to the engine 300 by way of the transport 330. It will be appreciated that the "ACK" of ACK/NACK 304 corresponds to an acknowledgement and the "NACK" corresponds to an indication that the message 302 has failed. Such a NACK may take the form of, for example, an error message or the like. As can be seen in FIG. 3, the ACK/NACK 304 message is not sent back to the main process 310. As was discussed above, the ACK/NACK 304 message may not arrive for some time (e.g., days, weeks, or even longer) after the transmission of the message 302, and the main program cannot remain idle for such a long period of time due to the high likelihood of encountering an error. Therefore, the ACK/NACK 304 message is sent to a compensation handler 320 instead. In such a compensation handler 320, the successful completion of message 302 may be recorded and/or passed along to the main process 310 or, if the message 302 encountered an error, tasks to counteract the failure of the message 302 may be initiated. As noted above, such tasks to counteract an error may include sending one or more messages to offset the failure of message 302, the initiation of an action and/or the like.

It will be appreciated that a developer who is attempting to automate one or more business processes involving asynchronous messaging using such a conventional method must keep track of a variety of program states to enable the compensation handler 320 can carry out the proper steps while operating independently from the main process 310. In addition, a developer must incorporate a method for the compensation handler 320 and main process 310 to interact after the compensation actions have been completed so the main process 310 will know the proper state(s) of the program.

Figure 4:
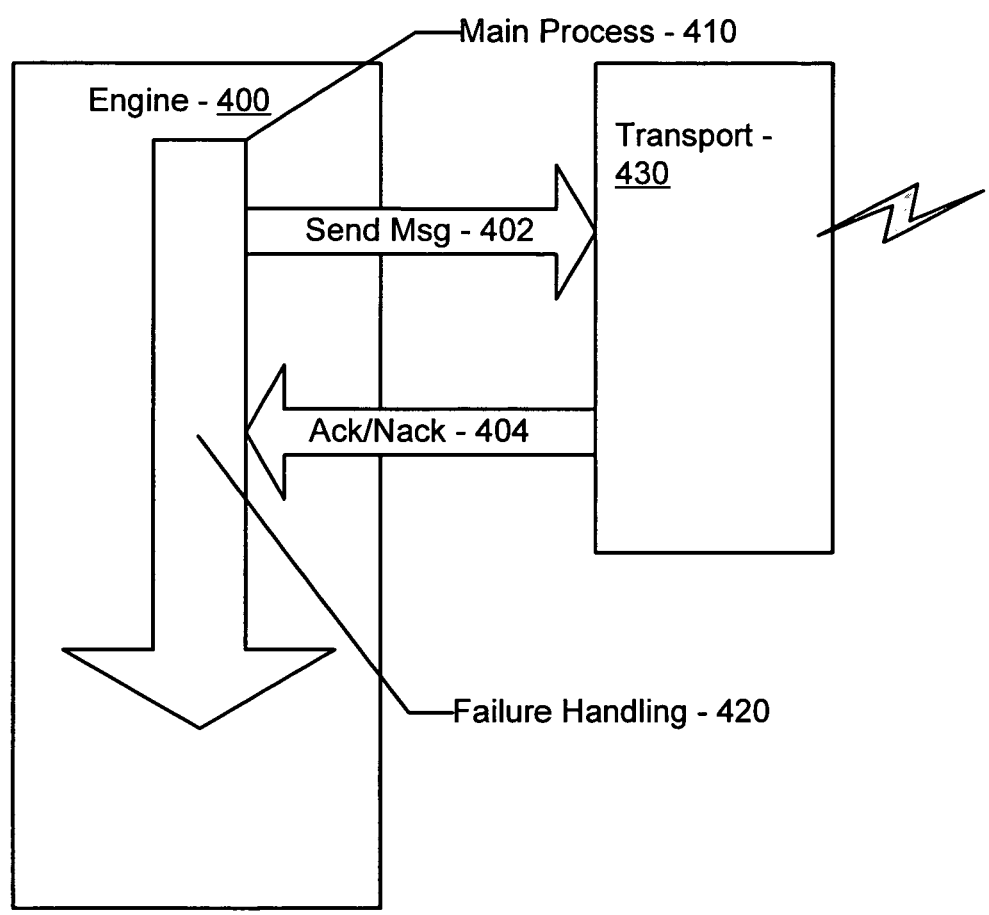
FIG. 4 is a block diagram illustrating a method of handling asynchronous message errors in accordance with one embodiment of the present invention.

Turning now to FIG. 4, a block diagram illustrating an exemplary programming configuration according to one embodiment of the present invention is illustrated. As was the case in FIG. 3, above, FIG. 4 illustrates an engine 400 and transport 430. Engine 400 executes a main process 410 that, at some point during its execution, sends a message 402 to the transport 430. As was also the case with FIG. 3, above, at some point after the transmission of the message 402, an ACK/NACK 404 message is transmitted from the transport 430 to the engine 400. However, and unlike the situation illustrated in FIG. 3, the ACK/NACK 404 message is sent directly back to the main process 400, which has internal failure handling 420 functionality to process the ACK/NACK 404 message. As will become clear in the discussion below, such failure handling 420 functionality may be provided by, for example, a try-catch code block as is used for synchronous messaging. Thus, it will be appreciated that the program flow illustrated in FIG. 4 resembles error handling as performed in a synchronous environment, except that the environment of FIG. 4 is asynchronous.

As noted above, XLANG/s is a stateful language. In other words, the state of operations such as, for example, the transmission and receipt of messages, is recorded in a database or other type of memory so that asynchronous and/or long-running transactions may be completed without errors. Using the above-mentioned buyer/seller example, if the instance of the business process at the buyer's end has sent an order to the seller, the instance will expect a response to the order (e.g., a confirmation or other type of response) at some point. Such a state—where the current status of the instance is that the order has been sent and is waiting for a response—is recorded. Thus, if an error occurs (e.g., a power outage, computer reboot or the like), the business process can be restarted at the point at which the error occurred, and the instance of the business process will resume waiting for a response to the message.

In an embodiment, this stateful nature enables XLANG/s to perform "dehydration" and "rehydration" of an instance of an orchestration service that is automating a business method process. When an instance has no activity occurring, and is expecting to wait for a message for an extended period of time, an engine—such as, for example, engine 400 as discussed above in connection with FIG. 4, above—may dehydrate the instance. The amount of time that may pass before dehydration is initiated can be predetermined, random or the like. Dehydration of an instance occurs when the engine persists all of the instance-specific states to a database or other stable memory and removes the instance from active memory. It will be appreciated that the act of dehydrating an instance frees up system resources for the processing of other, more active instances or for other processes. Rehydration is triggered, for example, by a message arriving at a port address associated with the dehydrated instance. The engine then restores the instance from the database into memory and processes the message according to the instance.

Accordingly, it will be appreciated that an embodiment of the present invention leverages the stateful nature of XLANG/s—or an equivalent stateful language—to dehydrate and rehydrate an instance in a manner that enables the use of try-catch code blocks to handle asynchronous messaging errors within the context of the main process of the instance. As a result, the use of synchronous error handling methods—which are generally easier to program and more familiar to developers—is enabled.

Figure 5:
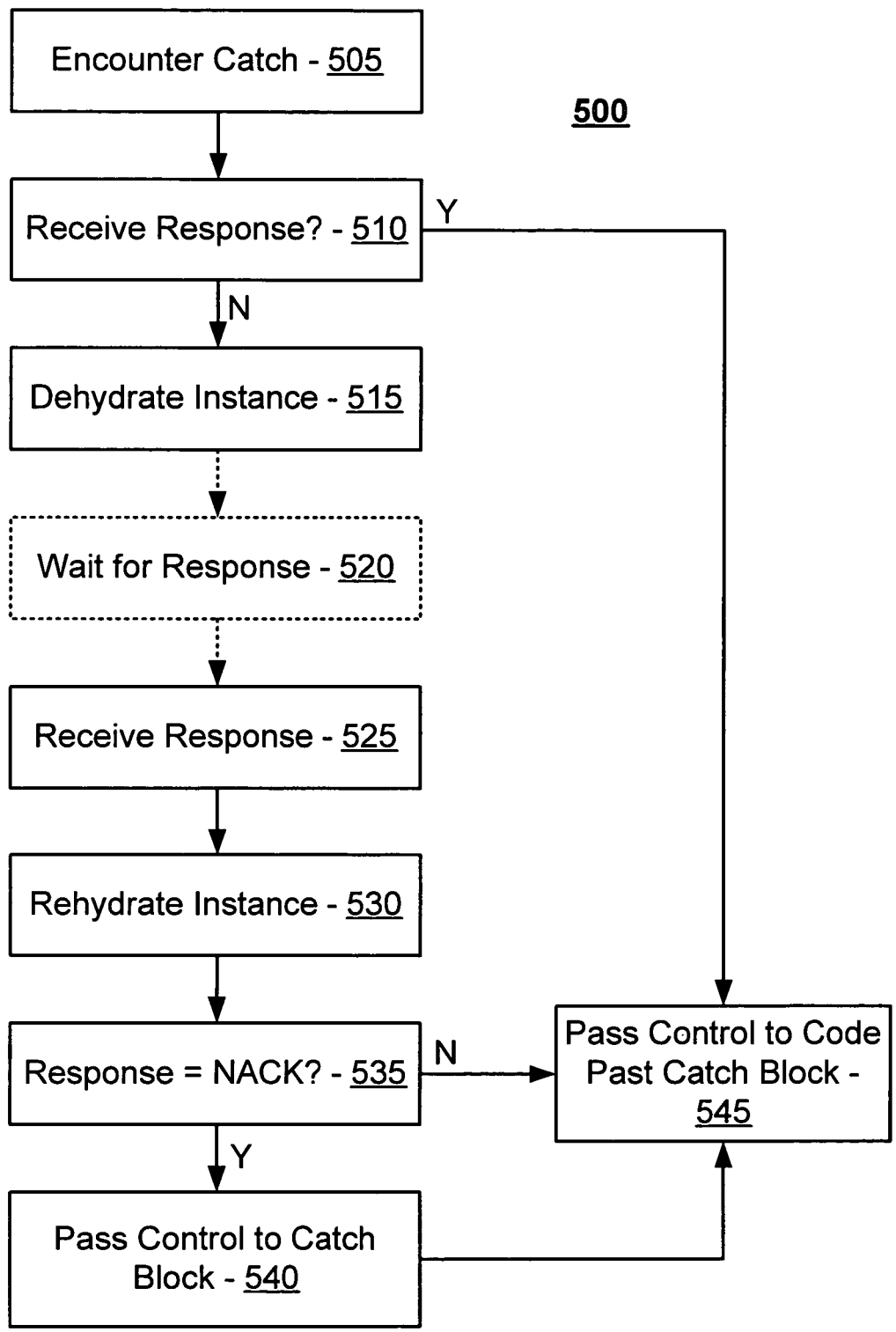
FIG. 5 is a flowchart illustrating an exemplary method of handling a delivery failure in accordance with one embodiment of the present invention.

Turning now to FIG. 5, a method 500 according to an embodiment of the present invention is illustrated. At step 505 a catch block—software code for determining whether a message has been successfully sent and/or received—is encountered. At step 510, a determination is made as to whether a response to the message or messages for which the catch block is designed to handle has been received. If a response has been received, no exception exists, and the method 500 passes control to the code after the catch block at step 545. If no response has been received, the instance is dehydrated at step 515, and at step 520 the method 500 waits for a response. As may be appreciated, such waiting of step 520 may take place over a long duration of time. In addition, the computing device or devices that are running the method 500 may be shut down, rebooted or the like, during the wait period of step 520.

At step 525, a response is received, which causes the method 500 to rehydrate the appropriate instance at step 530. As noted above, in one embodiment the response is received on a port defined by the instance, and therefore the engine (not shown in FIG. 5 for clarity) can easily determine the proper instance to rehydrate. At step 535, a determination is made as to whether the response is a NACK. If so, the method 500 knows that the message was not delivered properly, and appropriate compensation may be required. Thus, the method 500 passes control of the program to a catch block at step 540. Upon completing the compensation action(s) specified in the catch block, the method passes control to code past the catch block at step 545. If the response is not a NACK, thereby indicating proper handling of the message, then the method 500 passes control directly to the code that is past the catch block at step 540. It will be appreciated that such code may not be located exactly "after" the catch block in a conventional sense, but rather may be in any location that is logically after the catch block in terms of program execution.

Figure 6A:
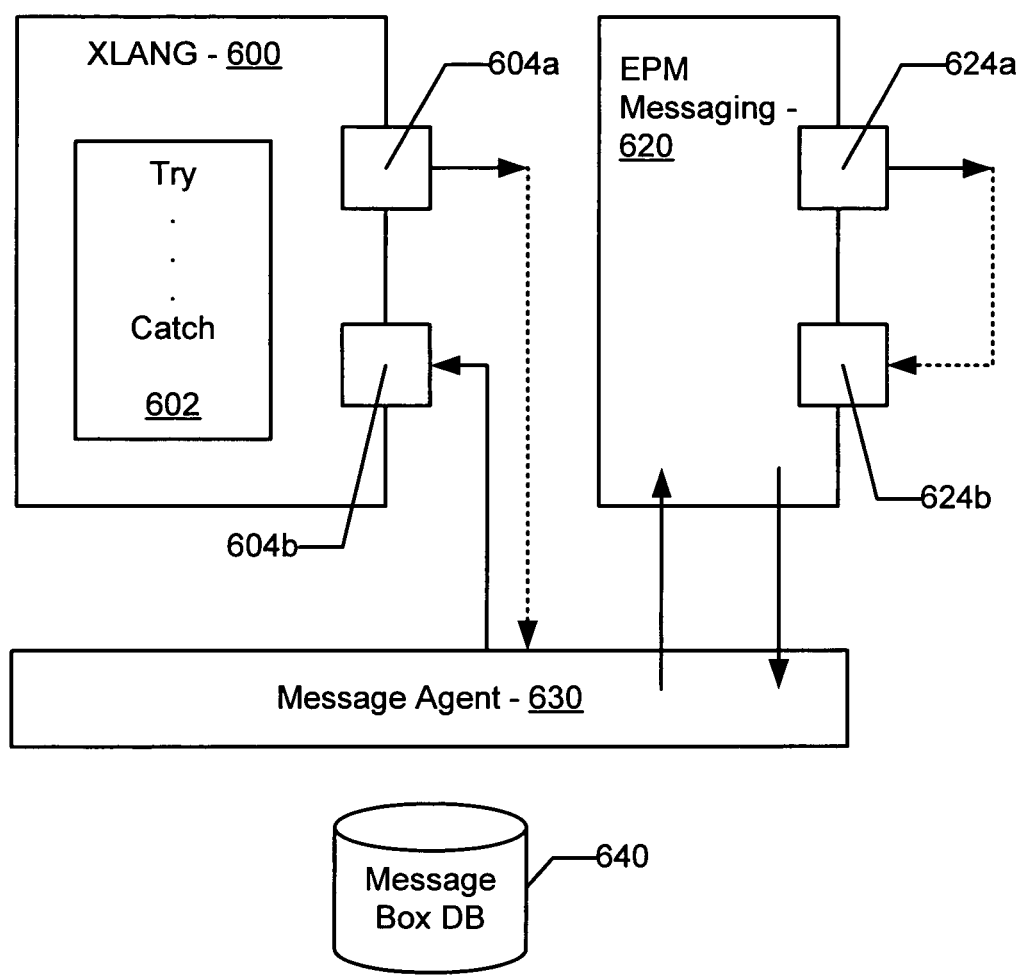
FIGS. 6A-B are block diagrams illustrating configurations of exemplary software components in which aspects of the invention may be implemented.

It will be appreciated that FIG. 6A, as well as FIG. 6B below, is a symbolic representation of a software configuration, and that any configuration is consistent with an embodiment of the present invention. It will also be appreciated that such a configuration provides an architecture upon which an embodiment of the present invention may be implemented. Turning now to FIG. 6A, a block diagram illustrates a software configuration in which an aspect of an embodiment of the present invention may be implemented. As can be seen in FIG. 6A, a XLANG/s instance 600 defines a send port 604a and a receive port 604b. In one embodiment, step 525 of FIG. 5 above receives a response on, for example, receive port 604b of instance 600. The instance 600 may also contain a try-catch exception block 602 to process one or more message errors—which would, for example, take place at step 540 of FIG. 5, above. Ports 604a and 604b send and receive messages, respectively, by way of a message agent 630. As will be appreciated, the message agent 630 is a computing abstraction that controls access to the message box database 640.

The message box database 640 contains, for example, message information pertaining to the XLANG/s instance 600. The message box database 640, or another database, is also capable of storing the instance 600 when or if such instance 600 is dehydrated. Also interacting with the message agent 630 is an enterprise program manager (EPM) 620. As should be known, an EPM 620 is a service that runs XLANG/s schedule instances and controls the activation, execution, dehydration and rehydration of a XLANG/s schedule. Thus, the EPM 620 is capable of at least determining when the instance 600 is waiting for a response (e.g., ACK/NACK or the like) and of performing steps 515 and 530 of FIG. 5, above. The EPM 620 communicates with external processes and devices by way of send port 624a and receive port 624b. On receive port 624b the EPM 620 can, for example, receive a response, ACK/NACK or the like. It will be appreciated that the EPM 620 can therefore determine that a response has been received and then rehydrate the instance 600.

Figure 6B:
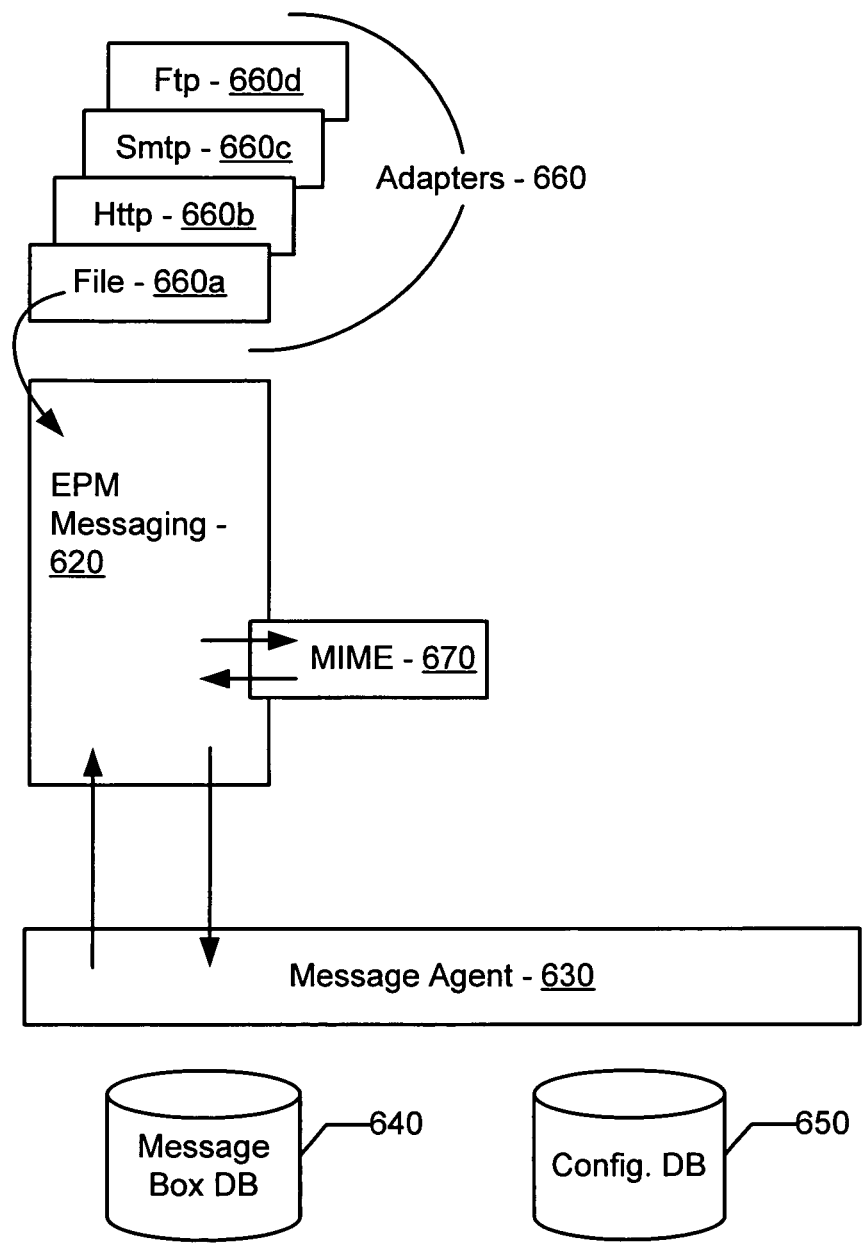

Turning now to FIG. 6B, a diagram illustrating a detail of the operation of the EPM 620 is shown. In FIG. 6B, it can be seen that EPM 620 is in operative communications with one or more adapters 660. Adapters 660 are used to permit the EPM 620 to send and/or receive business documents and/or messages to particular business applications. Thus, in FIG. 6B, EPM 620 has a file adapter 660a, a http adapter 660b, a smtp adapter 660c and a ftp adapter 660d. As will be appreciated, any number or configuration of adapters 660 may be in operative communications with the EPM 620. As may also be appreciated, in one embodiment such adapters 660 permit the method 500 of FIG. 5 receive a response at step 525 from a variety of different devices using any number of messaging formats. Also in operative communications with the EPM 620 is a Multipurpose Internet Mail Extensions (MIME) encoder/decoder 670. It will be appreciated that such a MIME encoder/decoder 670 is used to format email messages so client programs can decode and display complex message bodies that may contain, for example: rich text, multiple character sets, and binary attachments such as pictures, sounds, spreadsheets and the like. The EPM 620 is also in operative communications with message box database 640 and configuration database 650 by way of the message agent 630. In one embodiment, the configuration database 650, as the name implies, contains configuration data to enable the instance of the business process to operate properly.

Thus, a method and system for handling an error in an asynchronous messaging environment as a synchronous error has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type or configuration of business automation software in any type of application environment. Therefore, the present invention should not be limited to any single embodiment, but rather should be construed in breadth and scope in accordance with the appended claims.

What is claimed:

1. A messaging system for processing asynchronous message delivery failures and confirmations synchronously within an instance, the system comprising:
    a processor operatively coupled to a computer readable storage medium including computer executable instructions, the computer readable instructions when executed by the processor performing the steps of:
    executing an instance of an automated business process, the automated business process including response processing code, the response processing code including exception handling code specifying error compensation; and
    executing a program manager configured to manage the instance of the automated business process, wherein:
    the program manager further configured to detect when the instance of the automated business process is waiting for a response to a message, wherein a response indicates a success or failure of the message;
    the program manager further configured to store, when the instance is waiting for the response, at least a part of state information associated with the instance in a database and remove the instance from active memory;
    the program manager further configured to determine when the response associated with the instance has been received and the program manager further configured to restore the instance from the database into memory and pass the instance the message; and
    the instance further configured to process the response using the response processing code and handle exceptions using the exception handling code specifying error compensation within the instance thereby handling asynchronous messaging errors synchronously within the instance.

2. The system of claim 1, wherein the exception handling code is a try-catch block.

3. The system of claim 1, wherein storing the instance takes place after a predetermined time after the detection that the instance is waiting for the response.

4. The system of claim 1, wherein the response is received on a port defined by the instance.

5. The system of claim 1, wherein the response is a response indicative of whether or not the message was received by an intended recipient.

6. A method for processing a message in an asynchronous architecture, comprising:
    determining that a response to a message sent by an instance of software code is to be received, wherein the response indicates a success or failure of the message;
    determining whether the response has been received and, if the response has not been received, storing the instance of the software code in memory, thereby suspending the instance;
    receiving the response and resuming the instance; and
    processing the response using response processing code within the instance according to the success or failure of the message, wherein the response processing code has failure handling functionality specifying error compensation thereby handling asynchronous messaging errors synchronously within the instance.

7. The method of claim 6, wherein determining that the response is to be received is determined by encountering a catch block within the instance.

8. The method of claim 7, wherein processing the response comprises determining whether the response indicates a failure and, if so, processing the response using the catch block.

9. The method of claim 8, further comprising, if the response indicates a success, processing the response by way of the instance of the software code.

10. The method of claim 6, wherein storing the instance occurs after a predetermined time after the determination that the response has not been received.

11. The method of claim 6, wherein storing the instance comprises storing the instance in a database and removing the instance from active memory.

12. The method of claim 11, wherein resuming the instance comprises removing the instance from the database and restoring the instance to active memory.

13. The method of claim 6, wherein the response is received on a port defined by the instance.

14. The method of claim 6, wherein the asynchronous architecture is implemented by way of distributed business process automation software.

15. The method of claim 6, wherein the message is to be received by a remote computer.

16. A method for processing a message in an asynchronous architecture, comprising:
    encountering a catch block in an instance of running business process automation software, wherein the catch block indicates that a response to a message is to be received;
    determining whether the response has been received, wherein the response indicates a success or failure of the message, and if the response has not been received, storing the instance of the software code in memory, thereby suspending the instance;
    receiving the response and resuming the instance in accordance with the receipt of the response; and
    processing the response using response processing code within the instance according to the success or failure of the message, wherein the response processing code has failure handling functionality specifying error compensation thereby handling asynchronous messaging errors synchronously within the instance.

17. The method of claim 16, wherein processing the response comprises determining whether the response indicates a success or failure of the message and, if the response indicates a failure, processing the response using the catch block.

18. The method of claim 17, further comprising, if the response is indicative of a success, processing the response within the instance of the automation software and logically after the catch block.

19. The method of claim 16, wherein the response is received on a port defined by the instance.

20. A computer-readable storage medium having computer-readable instructions for performing a method for processing a message in an asynchronous architecture, the method comprising:
    determining that a response to a message sent by an instance of software code is to be received, wherein the response indicates a success or failure of the message;
    determining whether the response has been received and, if the response has not been received, storing the instance of the software code in memory, thereby suspending the instance;
    receiving the response and resuming the instance; and
    processing the response using response processing code within the instance according to the success or failure of the message, wherein the response processing code has failure handling functionality specifying error compensation thereby handling asynchronous messaging errors synchronously within the instance.

21. The computer-readable medium of claim 20, wherein determining that the response is to be received is determined by encountering a catch block within the instance.

22. The computer-readable medium of claim 21, wherein processing the response comprises determining whether the response indicates a failure and, if so, processing the response using the catch block.

23. The computer-readable medium of claim 22, further comprising, if the response indicates a success, processing the response by way of the instance of the software code.

24. The computer-readable medium of claim 20, wherein storing the instance occurs after a predetermined time after the determination that the response has not been received.

25. The computer-readable medium of claim 20, wherein storing the instance comprises storing the instance in a database and removing the instance from active memory.

26. The computer-readable medium of claim 25, wherein resuming the instance comprises removing the instance from the database and restoring the instance to active memory.

27. The computer-readable medium of claim 20, wherein the response is received on a port defined by the instance.

28. The computer-readable medium of claim 20, wherein the asynchronous architecture is implemented by way of distributed business process automation software.

29. The computer-readable medium of claim 20, wherein the message is to be received by a remote computer.

30. A computer-readable storage medium having computer-readable instructions for performing a method for processing a message in an asynchronous architecture, the method comprising:
    encountering a catch block in an instance of running business process automation software, wherein the catch block indicates that a response to a message is to be received;
    determining whether the response has been received, wherein the response indicates a success or failure of the message and, if the response has not been received, storing the instance of the software code in memory, thereby suspending the instance;

receiving the response and resuming the instance in accordance with the receipt of the response; and processing the response using response processing code within the instance according to the success or failure of the message, wherein the response processing code has failure handling functionality specifying error compensation thereby handling asynchronous messaging errors synchronously within the instance.

31. The computer-readable storage medium of claim 30, wherein processing the response comprises determining whether the response indicates a success or failure of the message and, if the response indicates a failure, processing the response using the catch block.

32. The computer-readable storage medium of claim 31, further comprising, if the response is indicative of a success, processing the response within the instance of the automation software and logically after the catch block.

33. The computer-readable storage medium of claim 30, wherein the response is received on a port defined by the instance.

* * * * *